United States Patent
Jang et al.

(10) Patent No.: US 7,602,559 B2
(45) Date of Patent: Oct. 13, 2009

(54) OPTICAL LENS, LIGHT EMITTING DEVICE PACKAGE USING THE OPTICAL LENS, AND BACKLIGHT UNIT

(75) Inventors: Jun Ho Jang, Anyang-si (KR); Jung Hoon Seo, Seoul (KR)

(73) Assignees: LG Electronics Inc., Seoul (KR); LG Innotek Co., Ltd., Seoul (KR)

( * ) Notice: Subject to any disclaimer, the term of this patent is extended or adjusted under 35 U.S.C. 154(b) by 58 days.

(21) Appl. No.: 11/410,800

(22) Filed: Apr. 26, 2006

(65) Prior Publication Data

US 2006/0238884 A1 Oct. 26, 2006

(30) Foreign Application Priority Data

Apr. 26, 2005 (KR) .............. 10-2005-0034473
Apr. 26, 2005 (KR) .............. 10-2005-0034543

(51) Int. Cl.
*G02B 17/00* (2006.01)
*F21V 7/00* (2006.01)

(52) U.S. Cl. .............. 359/726; 362/296.05; 362/296.01

(58) Field of Classification Search ......... 359/726–728; 362/296, 296.01–296.1; 257/98
See application file for complete search history.

(56) References Cited

U.S. PATENT DOCUMENTS

| | | | |
|---|---|---|---|
| 6,335,548 B1 * | 1/2002 | Roberts et al. ............... 257/98 |
| 6,679,621 B2 * | 1/2004 | West et al. .................. 362/327 |
| 7,280,288 B2 * | 10/2007 | Loh et al. .................... 359/726 |
| 7,433,134 B2 * | 10/2008 | Chou et al. ................. 359/726 |
| 7,473,013 B2 * | 1/2009 | Shimada .................... 362/327 |
| 2004/0130515 A1 | 7/2004 | Chuang et al. |
| 2004/0233665 A1 | 11/2004 | West et al. |
| 2006/0067640 A1 | 3/2006 | Hsieh et al. |
| 2008/0192479 A1 * | 8/2008 | Wanninger ................. 362/308 |

FOREIGN PATENT DOCUMENTS

| | | |
|---|---|---|
| EP | 0397393 A3 | 11/1990 |
| EP | 0397393 B1 | 11/1990 |
| EP | 03973923 A2 | 11/1990 |
| EP | 1376708 A2 | 1/2004 |
| JP | 2001-185762 A | 7/2001 |

* cited by examiner

*Primary Examiner*—Darryl J Collins
(74) *Attorney, Agent, or Firm*—McKenna Long & Aldridge LLP

(57) ABSTRACT

An optical lens, a light emitting device package using the optical lens and a backlight unit are disclosed, whereby light irradiated upward of a light emitting device is refracted from a bottom refraction surface to allow reaching a reflection surface, and an optical lens is mounted for reflecting the light sideways of the lens from the reflection surface to minimize an amount of light irradiated upward of the lens while increasing the amount of light irradiated toward the lateral surface of the lens, thereby limiting the generation of a hot spot to the maximum. The present invention dispenses with a hot spot baffle plate and a complicated assembly process to enable to reduce the number of parts and to decrease the thickness of a panel.

6 Claims, 11 Drawing Sheets

OPTICAL LENS, LIGHT EMITTING DEVICE PACKAGE USING THE OPTICAL LENS, AND BACKLIGHT UNIT

This application claims the benefit of the Korean Application No. 10-2005-0034473 filed on Apr. 26, 2005 and 10-2005-0034543 filed on Apr. 26, 2005 which are hereby incorporated by reference.

BACKGROUND

This description relates to an optical lens, a light emitting device package using the optical lens and a backlight unit.

A conventional light emitting diode is optically disposed with a domed lens, and light is limitedly distributed to within a predetermined region relative to a central axis. If a liquid crystal display (LCD) backlight unit is manufactured using the light emitting diode, one potential problem is that an even light characteristic cannot be obtained due to light emitting characteristic of the light emitting diode.

It implies that a considerable distance is needed to evenly combine white light radiated from the light emitting diode, making it difficult to obtain a uniform light characteristic from a thin backlight unit. In other words, a backlight unit using a light emitting diode brings about a disadvantage of increasing the thickness of an LCD system.

Figure 1:
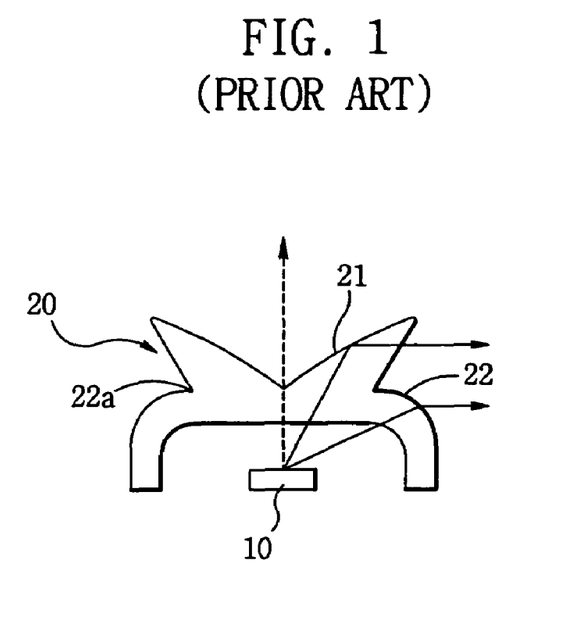
FIG. 1 is a schematic view illustrating a light path from a lateral optical lens according to the prior art.

FIG. 1 illustrates a light path from a lens for lateral light emitting according to the prior art, where a light emitting diode (LED.10) is disposed on a domed lens 20. The domed lens 20 is formed thereon with an inclined conical groove 21 and its side is formed with a V-shaped groove 22.

If light emitted from the LED 10 contacts a surface of the conical groove 21, the light is reflected from the inclined conical groove 21 to be radiated sidewise of the lens. If light contacts the V-shaped groove 22 of the lens 20, the light passes through the lens 20 to be radiated sideways of the lens.

In other words, an LED for laterally emitting (or side-emitting) light (hereinafter referred to as a lateral LED) according to the prior art serves to laterally radiate light emitted from the LED 10 using a lens.

Meanwhile, the injection-molded lens 20 is formed at a region corresponding to an apex 22a of the V-shaped groove 22 with prominences and depressions (unevenness) if closely looked at (for example, in less than a millimeter unit), such that light of the LED 10 emitted from the region is not radiated sideways of the lens 10 but upwards of the lens 10.

Figure 2:
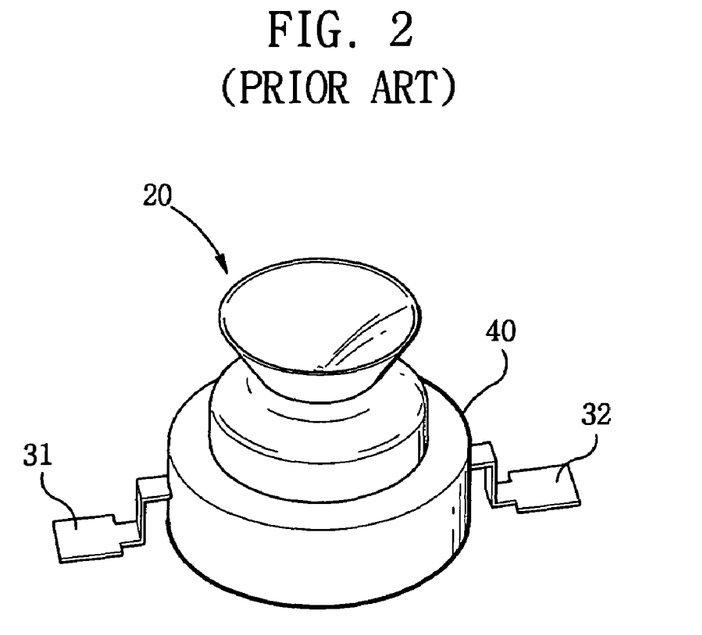
FIG. 2 is a schematic perspective view of a light emitting diode package of FIG. 1.

FIG. 2 is a schematic perspective view of an LED package of FIG. 1, where the LED is bonded to a slug, and the slug is disposed at sides thereof with leads 31 and 32 which are in turn electrically bonded to the LED.

Furthermore, the LED and the slug are molded by molding means in order to expose a light emitting surface of the LED and the leads 31 and 32, and the lens 20 of FIG. 1 encompassing the LED is bonded to the molding means.

Figure 3:
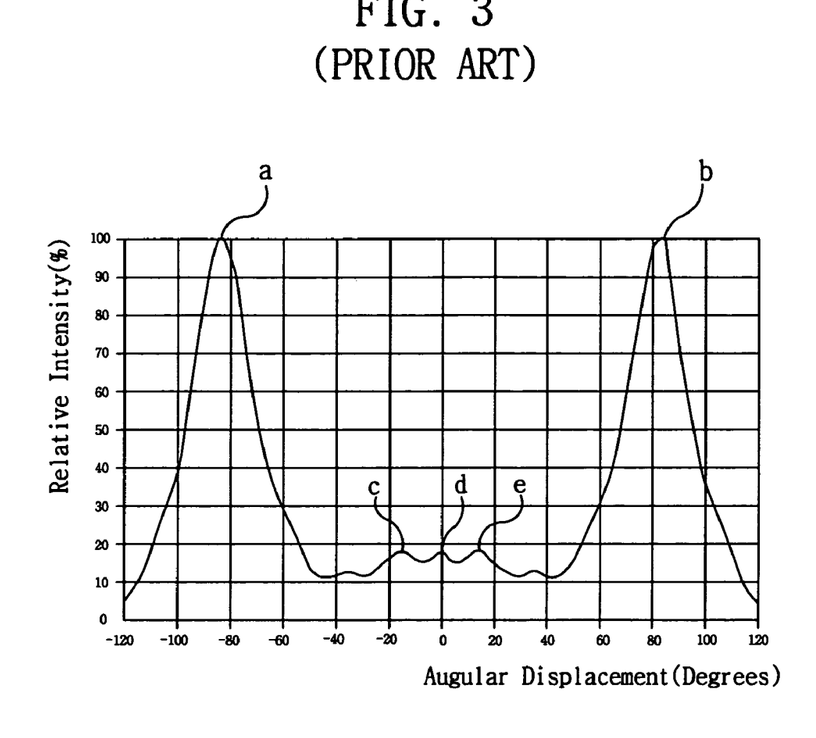
FIG. 3 is a schematic view explaining one of the reasons why a hot spot is generated from an optical lens according to the prior art.

FIG. 3 is a light emitting distribution table of an LED package according to the prior art, where it shows that a large amount of light is radiated sidewise of the package as indicated in 'a' and 'b' of the distribution table while a small amount of light is radiated through a center of the package.

FIG. 1 implies that although most of the light is radiated sideways of the lens, some of the light is radiated upwards of the lens. In other words, the LED package thus described cannot implement a perfect light emission to lateral surfaces, such that if it is used as a light source for a display, light is partially emitted from the light emitting diode relative to the center of the LED package, resulting in a problem in making a planar light source.

Figure 4:
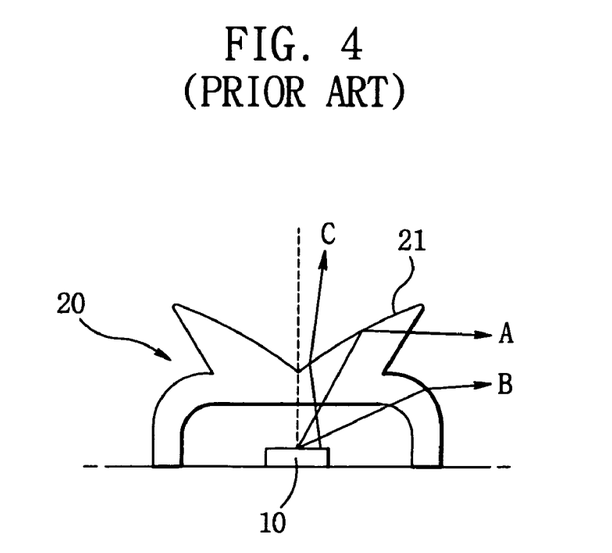
FIG. 4 is a cross-sectional view illustrating a printed circuit board in which a light emitting diode is packaged according to prior art.

To be more specific, the partial emission of light relative to the center of the LED package results in so-called light irregularity referred to as a hot spot phenomenon where spots are generated about a center of pixels displayed on the display, causing degradation of picture quality on the display. FIG. 4 illustrates in detail one of the causes generating the hot spots.

If the size of a light emitting diode 10 is very small, an amount of light emitted to a lateral surface of a lens by being reflected from a surface 21 of a conical shaped groove according to the prior art increases, but if the size of the light emitting diode 10 is large, light (C) progressing at an angle less than a critical angle from the surface 21 of the conical shaped groove exists to allow the light to be emitted from an upper surface of the lens, thereby generating the hot spot, because the surface 21 of the conical shaped groove totally reflects only the light (A) progressing at an angle larger than the critical angle out of light radiated from the light emitting diode 10.

At this time, light (B) progressing to a lateral surface of the lens is nothing to do with hot spots, as shown in FIG. 4.

Figure 5:
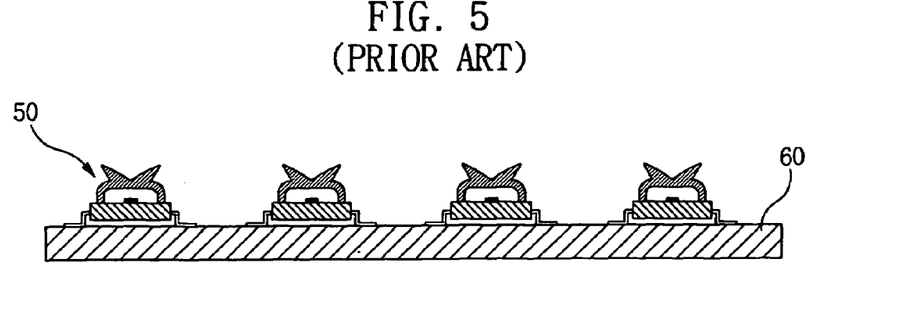
FIG. 5 is a cross-sectional view illustrating a light emitting diode packaged in a printed circuit board according to the prior art.

FIG. 5 illustrates a cross-sectional view of a light emitting diode packaged in a printed circuit board according to the prior art, where a plurality of lateral light emitting diode packages 50 are packaged in a printed circuit board 60. As mentioned, a printed circuit board packaged with lateral light emitting diode packages is employed for a backlight unit as depicted in FIG. 6.

Figure 6:
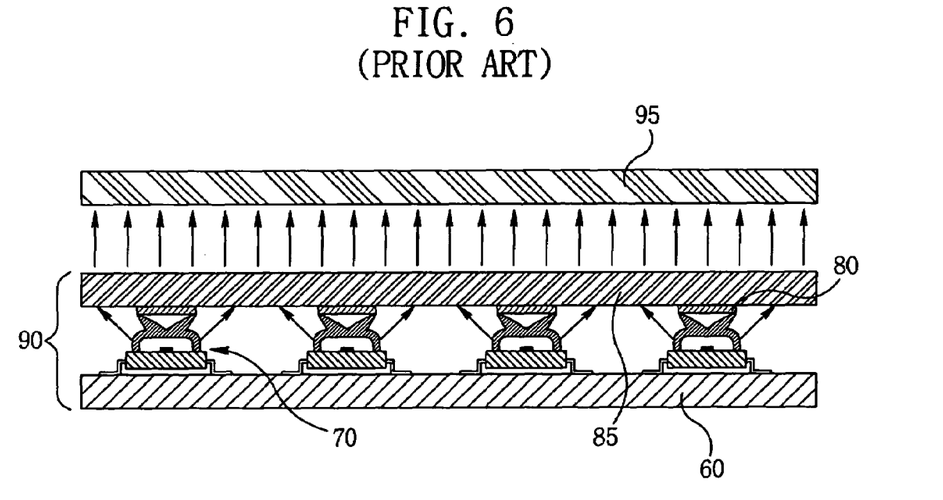
FIG. 6 is a schematic cross-sectional view of a light emitting diode employed for an LCD backlight unit according to the prior art.

FIG. 6 is a schematic cross-sectional view of a light emitting diode employed for an LCD backlight unit according to the prior art.

In order to address the problem of the light emitted to the center of the light emitting diode package, an LCD backlight unit is mounted with a hot spot baffle plate 80. In other words, an LCD backlight unit 90 is configured in such a manner that hot spot baffle plates 80 are mounted on each light emitting diode package 70 packaged in the printed circuit board 60, and a light guide plate 85 is disposed on an upper surface of the hot spot baffle plate 80, and an upper surface distanced from the light guide plate 85 is disposed with an LCD 95 to finish the assembly of the backlight unit 90 and the LCD 95.

There is a disadvantage in the backlight unit 90 thus constructed in that a plurality of light emitting diode packages 90 should be mounted thereon with hot spot baffle plates 80 called diverters to complicate the assembly process.

There is another disadvantage in that if there is an erroneous arrangement of the hot spot baffle plates 80 on the plurality of light emitting diode packages 70, spots similar to the hot spots are generated on a screen of a final display. Still another disadvantage is that thickness of the display panel increases as much as that of the hot spot baffle plate 80.

SUMMARY

In one general aspect, an optical lens comprises: a reflection surface formed thereon for reflecting light emitted upwards from thereunder; and a bottom refraction surface for refracting the light emitted upwards from thereunder and allowing the light to reach the reflection surface.

In another general aspect, a light emitting device package comprises: a light emitting device for emitting light; and an optical lens disposed with a reflection surface formed thereon for reflecting light emitted upwards from the light emitting device and a bottom refraction surface for refracting the light emitted upwards from the light emitting device and allowing the light to reach the reflection surface.

In still another general aspect, a backlight unit comprises: a substrate; a plurality of light emitting devices packaged in the substrate for emitting light; a plurality of optical lenses disposed with a reflection surface formed thereon for reflecting light emitted upwards from the plurality of light emitting devices and a bottom refraction surface for refracting the light emitted upwards from the plurality of light emitting devices and allowing the light to reach the reflection surface; and a diffusion plate disposed on the plurality of optical lenses.

DETAILED DESCRIPTION

Figure 7:
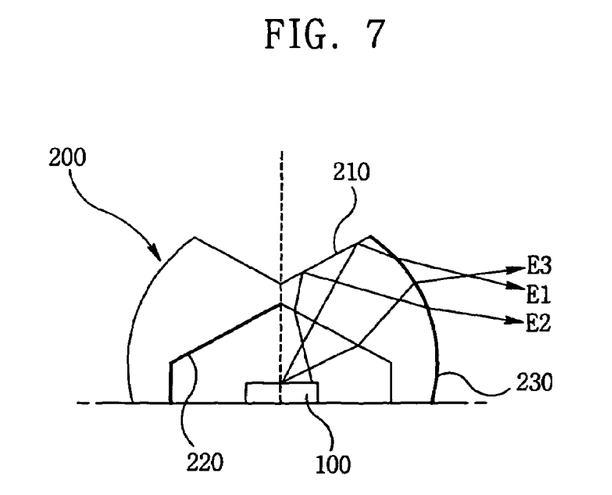
FIG. 7 is a cross-sectional view of an optical lens and a light emitting device using the optical lens according to a first embodiment of the present invention.

Referring to FIG. 7, an optical lens 200 according to a first embodiment of the present invention comprises: a reflection surface 210 formed thereon for reflecting light emitted upwards from a light emitting device; and a bottom refraction surface 220 for refracting the light emitted upwards from the light emitting device and allowing the light to reach the reflection surface 210, where a path of the light incident from thereunder is changed to reach a lateral surface of the optical lens 200.

At this time, the optical lens 200 is comprised of a body. The body is formed thereon with the reflection surface 210, and is also formed with the bottom refraction surface 220 from which the light incident thereunder is refracted and irradiated.

The light incident on the reflection surface 210 is the one emitted from a bottom side of the body toward an upper side of the body, and the light incident from the bottom side of the body is composed of the one refracted and irradiated upward of the body and the one irradiated to a lateral surface of the body. Preferably, the optical lens 200 is further comprised of an external refraction surface 230 formed at a lateral surface of the body for refracting the light reflected from the reflection surface 210 and light irradiated to the lateral surface of the body to be irradiated to the lateral surface of the body.

In other words, the lateral surface of the body comprising the optical lens is formed with the external refraction surface 230. Preferably, the bottom refraction surface 220 is formed at an upper side of a light emitting device 100.

Preferably, the body of the optical lens 200 including the reflection surface 210, the bottom refraction surface 220 and the external refraction surface 230 is shaped of a hemisphere as shown in FIG. 7. At this time, the reflection surface 210 is generated by cutting the hemispherical upper side of the body to form an intaglio-type look. Preferably, the external refraction surface 230 is a curved surface protruding outward for forming the hemisphere except for a bottom portion of the hemisphere.

In the optical lens 200 thus configured according to the first embodiment of the present invention, the light irradiated upwards of the optical lens from the light emitting device 100 is refracted from the bottom refraction surface 220 to reach the reflection surface 210, where the reflection surface 210 reflects the light. The external refraction surface 230 of the optical lens 200 refracts the light reflected from the reflection surface 210 and allows the light to be irradiated to the lateral surface of the optical lens 200.

To be more specific, arrows 'E1', 'E2' and 'E3' of FIG. 7 respectively denote paths of the light emitted upwards of the light emitting device 100, and the light is irradiated to the lateral surface of the optical lens 200 by the bottom refraction surface 220, the reflection surface 210 and the external refraction surface 230.

Preferably, the reflection surfaces 210 are inclined, and the bottom refraction surfaces 220 are symmetrically inclined from the reflection surfaces 210 with respect to the horizontal line. More preferably, the reflection surfaces are formed by removing an upper side of the body in the shape of a cone, and the bottom refraction surface is formed by removing a bottom side of the body in the shape of a cone.

Meanwhile, the optical lens 200 is made of a material selected from the group consisting of PC (Polycarbonate), PMMA (Polymethylmethacrylate), silicon, fluorocarbon polymers, or PEI (Polyetherimide).

As evidenced from the foregoing, a light emitting device package using an optical lens according to the first embodiment of the present invention comprises the optical lens composed of a light emitting device 100 for emitting light, the bottom refraction surface 220 for refracting the light irradiated upwards of the light emitting device 100, the reflection surface 210 for receiving the light refracted by the bottom refraction surface 220 and irradiates the light to the lateral surface of the light emitting device 100.

The optical lens optionally further includes the external refraction surface 230 for refracting the light reflected from the reflection surface 210 and the light irradiated toward the lateral surface of the light emitting device 100 and emitting the light towards the lateral surface of the light emitting device 100.

Figure 8:
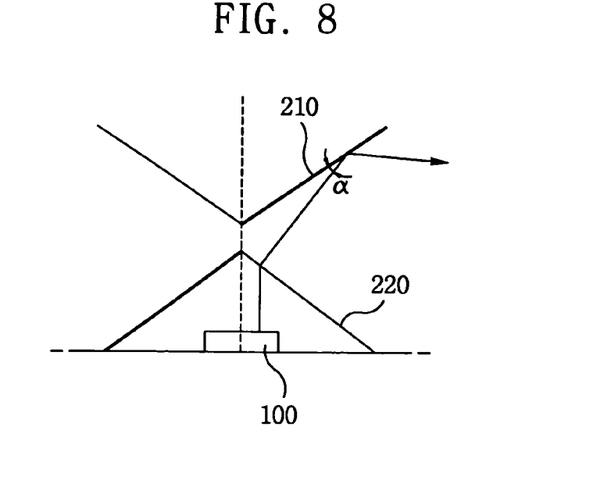
FIG. 8 is a schematic view of another function of the optical lens according to the first embodiment of the present invention.

Now, referring to FIG. 8, the bottom refraction surface 220 of the optical lens serves to refract the light incident from the light emitting device 100 in such a manner that the light can be incident on the reflection surface 210 at an angle exceeding a critical angle, if the reflection surface 210 formed at the optical lens conducts a reflection operation by totally reflecting the light incident at an angle (a) exceeding the critical angle.

In other words, the bottom refraction surface 220 at the optical lens according to the present invention functions to refract a path of the light irradiated upwards from the light emitting device 100 so that the light can be incident on the reflection surface at an angle exceeding the critical angle, thereby reducing the amount of light irradiated upwards of the optical lens to the maximum and simultaneously increasing the amount of light irradiated to the lateral surface of the lens.

Consequently, there is an advantage in that generation of hot spots occurring in the prior art can be limited to the maximum if an optical lens and a light emitting device package employing the lens are used for a backlight of a display.

Figure 9A:
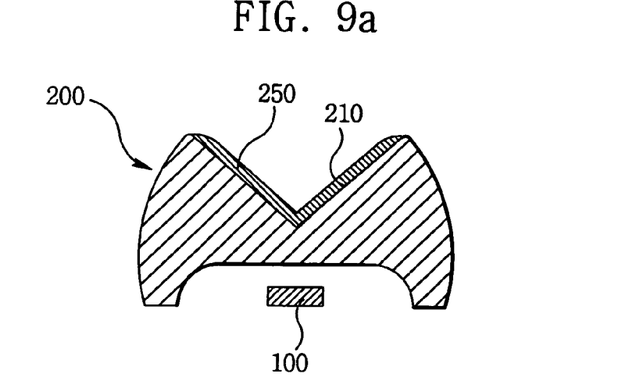
FIGS. 9a to 9c are cross-sectional views of various shapes of the optical lens according to the first embodiment of the present invention.
Figure 9B:
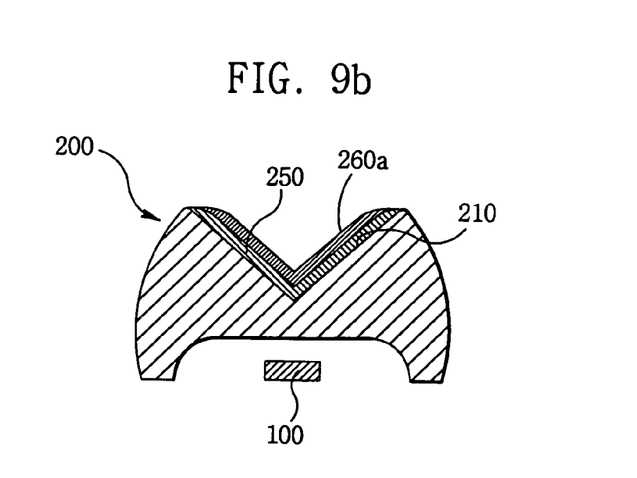
Figure 9C:
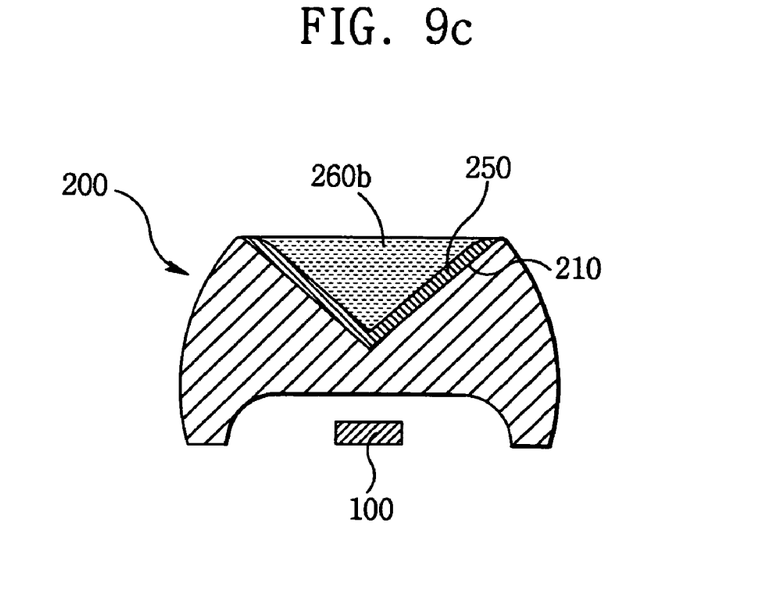

Now, referring to FIGS. 9a to 9c, a reflection film 250 is coated on the reflection surface 210 of the optical lens 200.

The reflection film 250 is formed with a metallic film or a high reflective film, and the metallic film is made of any one of Ag, Al or Rh, or a combination thereof. If the reflection film 250 is coated, the light is not emitted upwards of the lens 200 but is emitted only through the lateral surface of the lens 200. In other words, the hot spot occurring in the prior art is completely removed to thereby enable to improve the picture quality of the display.

Furthermore, as shown in FIG. 9b, if a non-permeable material film 260a is further coated on an upper surface of the coated reflection film 250, the light is prevented from permeating through the reflection surface 210 of the lens 200 and exiting upwards of the lens 200.

Concurrently, as illustrated in FIG. 9c, the V-shaped grooved reflection surfaces 210 may be coated with the reflection film 250 and be filled with non-permeable material film 260b.

Figure 10:
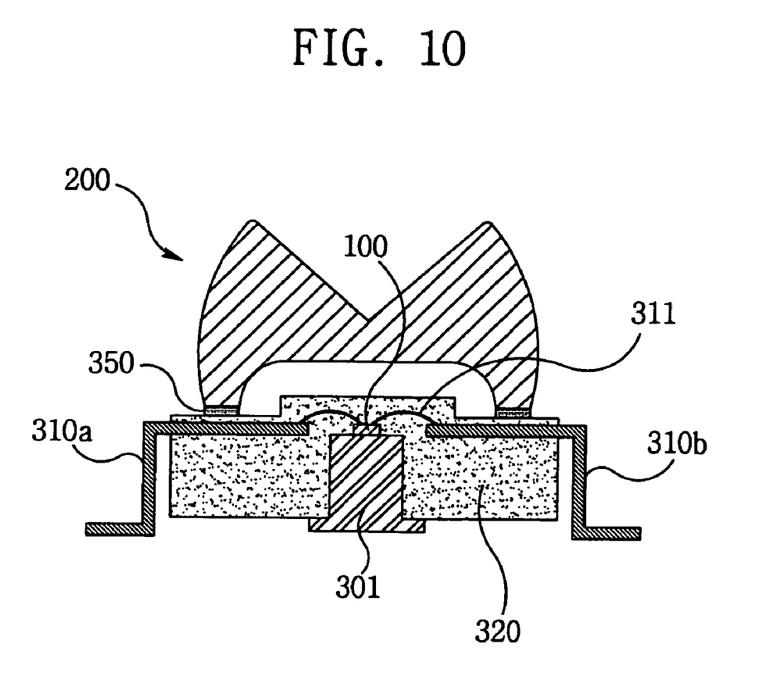
FIG. 10 is a schematic cross-sectional view of a light emitting diode package using an optical lens according to the first embodiment of the present invention.

FIG. 10 illustrates an example of a light emitting device package, where the light emitting device 100 is bonded to a heat slug 301 of a base member, and is bonded by wires 311 to leads 310a and 310b which are terminals each disposed at an external side distanced from the heat slug 301, where the light emitting device 100 and the leads 310a and 310b are electrically connected. Furthermore, part of the light emitting device 100, the heat slug 301 and leads 310a and 310b are wrapped by a molding unit 320.

At this time, part of the heat slug 301 is exposed outside of the molding unit 320 to allow heat generated from the light emitting device 100 to be easily discharged, and the leads 310a and 310b are exposed outside of the molding unit 320 to be electrically connected to the outside. The optical lens 200 is bonded to an upper side of the molding unit 320 by way of an adhesive 350.

Although the light emitting device may be bonded to a base member such as the heat slug 301 or the like as depicted in FIG. 10, the light emitting device is flip-chip bonded to conductive lines if a sub-mount substrate formed with the conductive lines is a base member, or if the base member is a substrate formed with a reflection-groove, the light emitting device is bonded to the reflection-groove of the sub-mount substrate. Accordingly, methods vary for implementing a structure of a light emitting device package using the optical lens 200.

FIGS. 11a to 11d are light emitting distribution graphs of a light emitting device package using an optical lens according to the present invention.

Figure 11A:
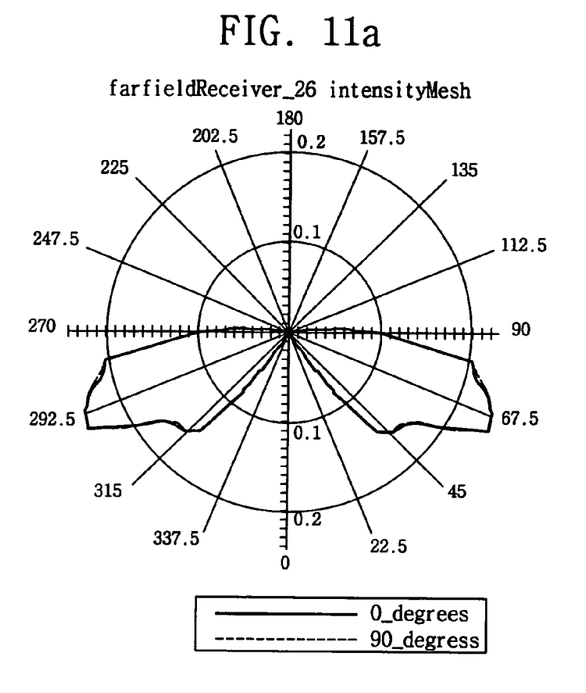
FIGS. 11a to 11d are light emitting distribution graphs of a light emitting device package using an optical lens according to the present invention.
Figure 11B:
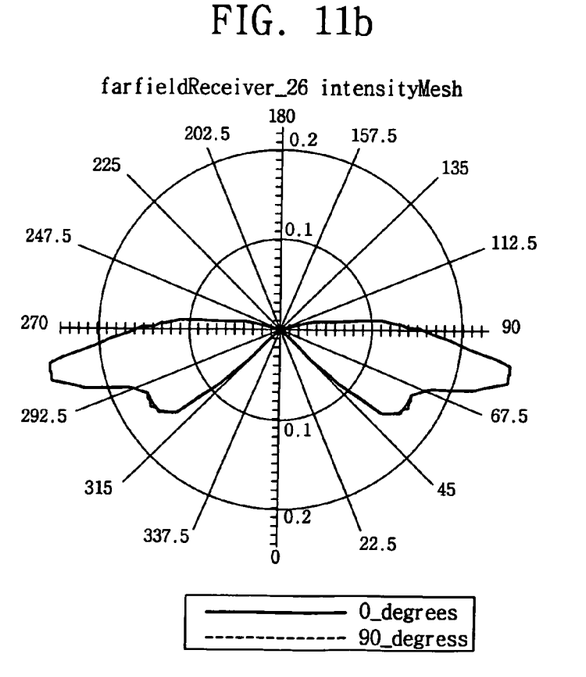
Figure 11C:
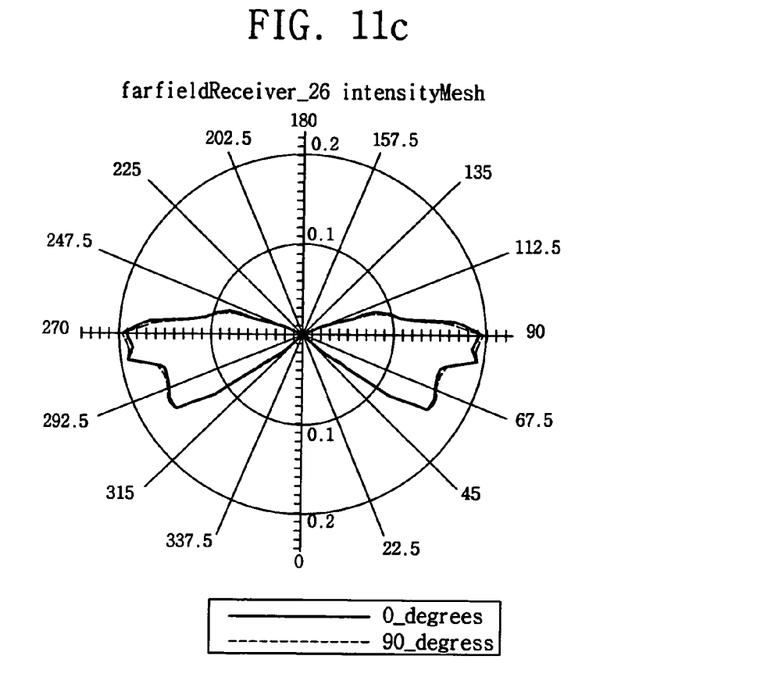
Figure 11D:
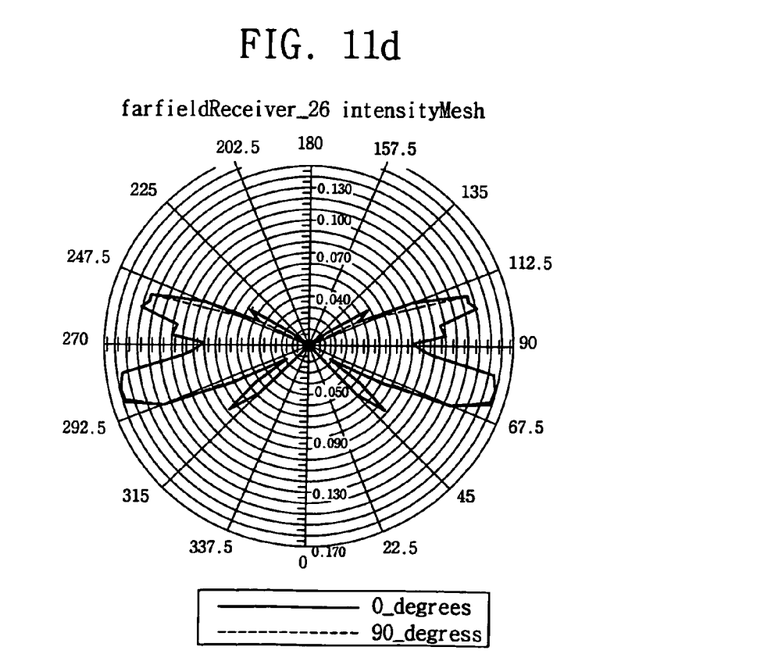
Figure 12:
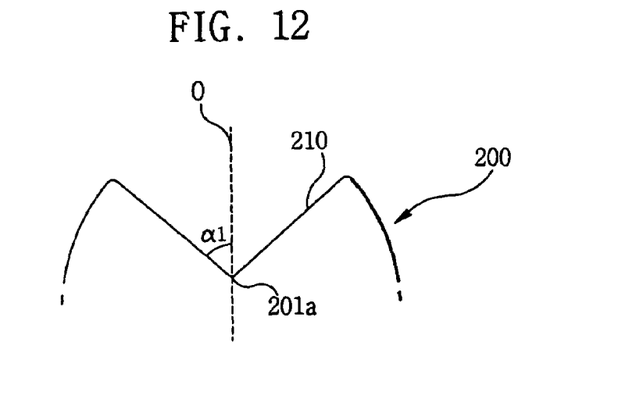
FIG. 12 is a partial schematic cross-sectional view of an optical lens according to the present invention.

Referring to FIG. 12, an inclination ($\alpha 1$) of the reflection surface 210 at the optical lens 200 may be adjusted in consideration of the lateral light emitting characteristic. The inclination ($\alpha 1$) is an angle formed between the reflection surface 210 and a perpendicular line (O) extended from an apex of the v-shaped groove. A light emitting distribution with respect to the inclination ($\alpha 1$) is such that a light output is 100% at 45 degrees of the inclination (FIG. 11a), 98% at 55 degrees (FIG. 11b), 93% at 65 degrees (FIG. 11c) and 81% at 75 degrees (FIG. 11d).

However, as noted from the light emitting distribution graphs, as the inclination goes from 45 degrees to 75 degrees, the light is further emitted to the lateral surface of the lens.

After all, a lateral surface light emitting distribution and a light emitting efficiency are correlated with respect to the inclination, such that it is preferable that the inclination be in between 20 degrees and 80 degrees in order to maintain an optimum light distribution.

Figure 13:
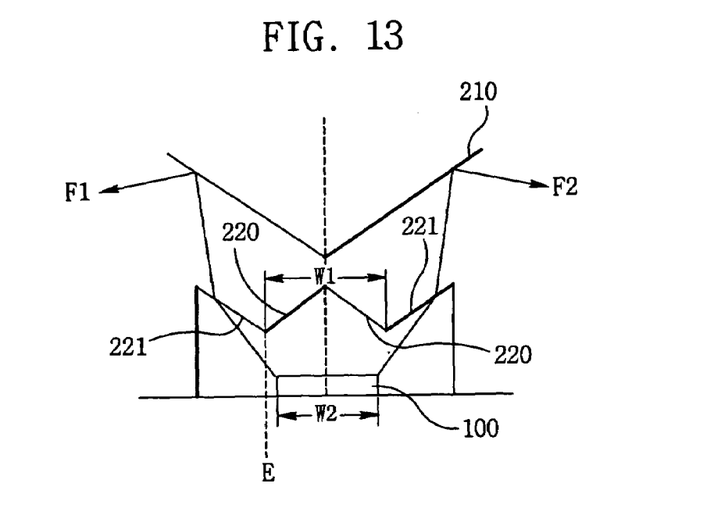
FIG. 13 is a cross-sectional view of an optical lens and a light emitting device using the optical lens according to a second embodiment of the present invention.

Now, referring to FIG. 13, an optical lens according to a second embodiment of the present invention is formed with a marginal refraction surface 221 for refracting the light in addition to the bottom refraction surface 220 of the first embodiment of the present invention of FIG. 7, so that light emitted from an upper margin of the light emitting device 100 can have a path on which the light is reflected from the reflection surface 210.

Furthermore, the marginal refraction surface 221 may be a symmetrically inclined surface formed by a perpendicular line (E) and the inclined bottom refraction surface 220.

To be more specific on the structure of the optical lens, the lens is disposed thereon with a V-shaped conical groove, where surfaces of the conical groove are used for reflection surfaces, and the lens is also formed thereunder with a cylindrical groove by removing a bottom thereof in which a light emitting device 100 is mounted as shown in FIG. 13. The cylindrical groove is formed thereon with a W-shaped (sawtooth) intaglio.

Consequently, if the optical lens according to the second embodiment of the present invention is employed for a large-sized light source, the light irradiated from the margin of the light emitting device is refracted by the bottom refraction surface 220 to prevent the light from deviating from a light path reflected from the reflection surface. The marginal refraction surface 221 serves to refract the light irradiated from the margin of the light emitting device to a path for reflecting the light from the reflection surface and to emit the light to lateral surfaces (F1 and F2 paths) of the lens.

The configuration of the optical lens may be freely designed and changed by using a refraction path of light (Light is reflected back into a denser medium if the angle of incidence is less than a certain critical angle when the light travels from the denser medium into a less dense medium and vice versa.) generated by a difference of refractive index between a light emitting device and air into which the light is emitted.

Furthermore, the optical lens is composed of a body symmetrized by a central axis, where the body includes reflection surfaces and marginal refraction surfaces.

If the refraction surface is inclined toward the central axis, it is preferable that the marginal refraction surface be also inclined toward the central axis. The object of the present invention may be realized by an optical lens employing a single constituent element of a marginal refraction surface, by allowing the marginal refraction surface to perform a function of refracting light irradiated from upward of a light emitting device and of bringing the light to a reflection surface.

Meanwhile, width (W1) of the bottom refraction surface 220 in FIG. 13 may be so designed as to be wider than that (W2) of a light emitting device. Furthermore, the optical lens according to the second embodiment of the present invention is the same as that of the first embodiment except that there is an additional marginal refraction surface on the optical lens.

Figure 14:
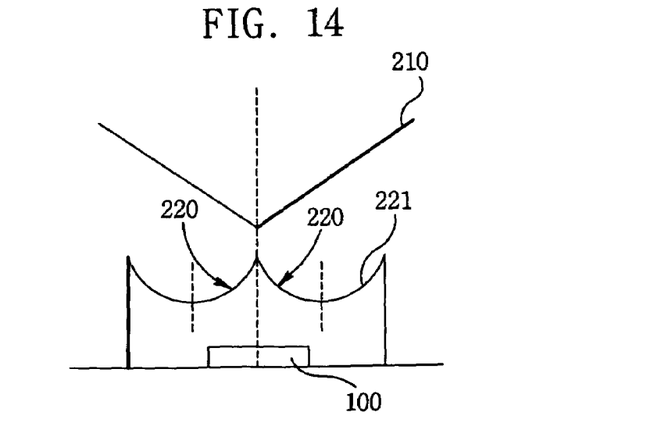
FIG. 14 is a schematic view of a shape of a refraction surface of an optical lens according to the second embodiment of the present invention.

Now, referring to FIG. 14, a bottom refraction surface and a marginal refraction surface may be respectively concaved. These types of concaves can also refract light irradiated upward of a light emitting device to allow reaching the reflection surface 210 and enable to reflect the light toward the lateral surfaces of the lens from the reflection surface 210.

Figure 15A:
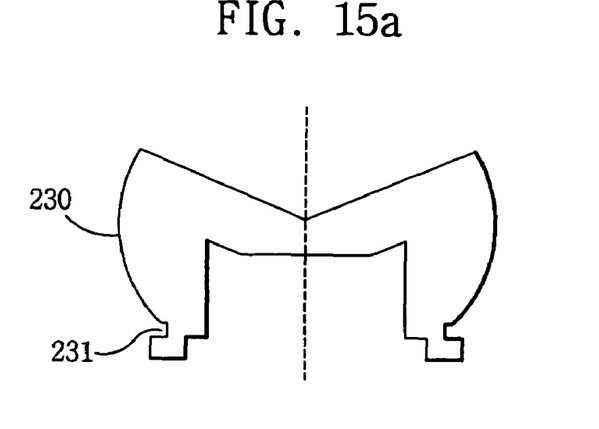
FIGS. 15a and 15b are cross-sectional views of an optical lens in another shape according to the second embodiment of the present invention.
Figure 15B:
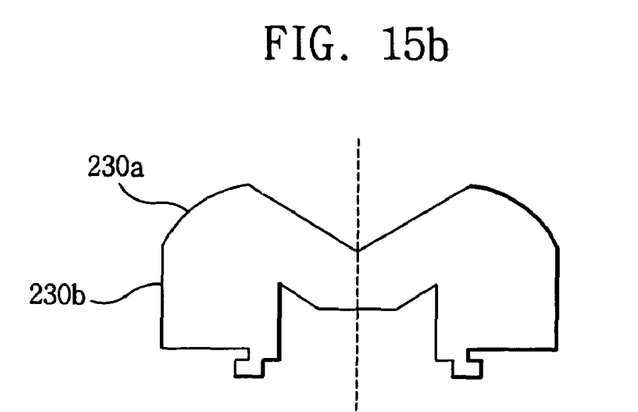

Now, referring to FIG. 15a, a convex external refraction surface 230 is externally formed at the optical lens and is formed thereunder with a locking hole 231 for easing and expediting the assembly of the lens. Referring to FIG. 15b, a convex external refraction surface 230 may be formed by combining a convex surface 230a and a plain surface 230b.

As described erstwhile, the present invention can increase an amount of light irradiated toward the lateral surface of the lens in comparison with the prior art.

Figure 16A:
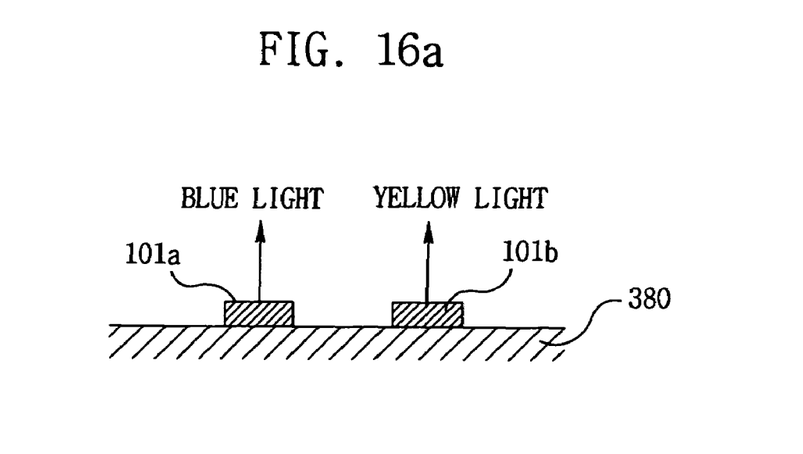
FIGS. 16a and 16b are cross-sectional views of a light emitting device bonded to a base member of a light emitting device package according to the present invention.
Figure 16B:
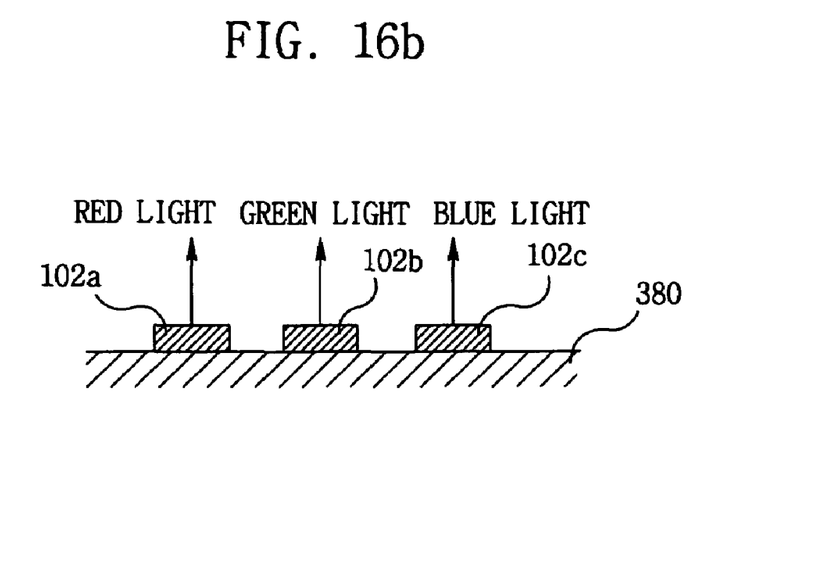

Now, referring to FIG. 16a, a base member 380 may be bonded by devices comprising: a blue light emitting device 101a for emitting blue light; and a yellow light emitting device 101b for emitting yellow light to enable to emit white light to a lateral surface. As depicted in FIG. 16b, the base member 380 may be bonded by devices comprising: a red light emitting device 102a for emitting red light; a green light emitting device 102b for emitting green light; and a blue light emitting device 102c for emitting blue light to enable to emit the white light to a lateral surface.

Meanwhile, although it is not shown in the drawing, a single light emitting device for emitting white light may be bonded to the base member 380 to allow the white light to be emitted to the lateral surface.

Figure 17:
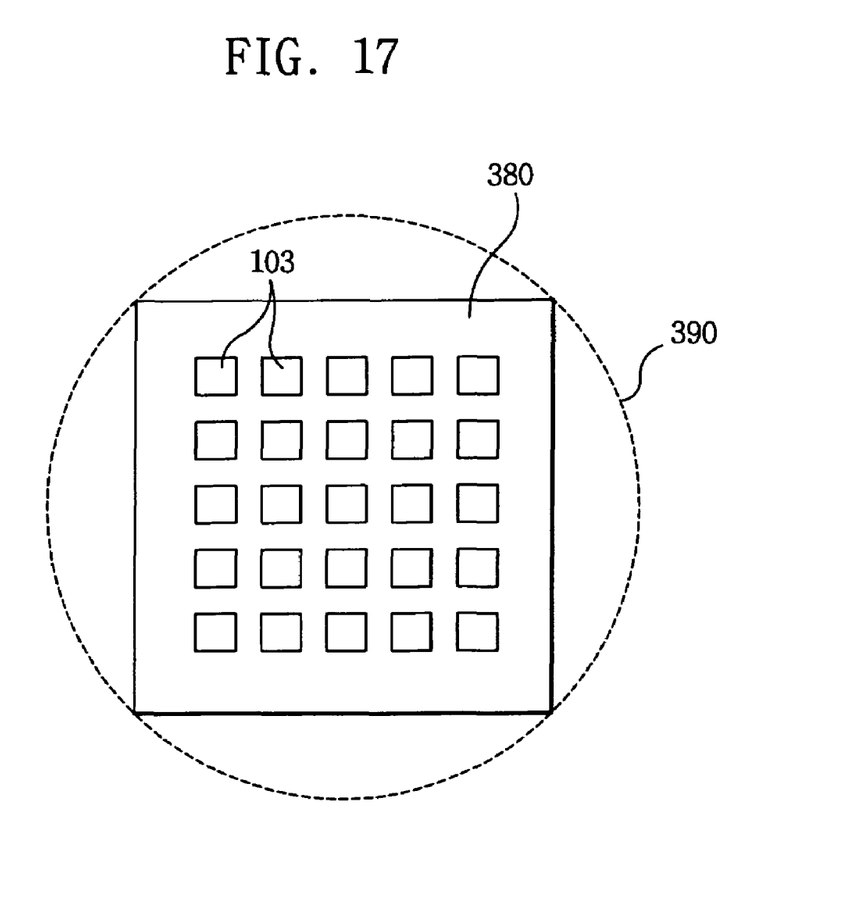
FIG. 17 is a plan view of a plurality of light emitting devices bonded to a base member of a light emitting device according to the present invention.

FIG. 17 is a plan view of a plurality of light emitting devices bonded to a base member of a light emitting device according to the present invention, where dotted lines refer to an area where an optical lens is mounted, and a base member of a light emitting device is disposed in the area where the lens is mounted.

The base member 380 is bonded thereon by a plurality of light emitting devices 103, enabling to improve a light output. The plurality of light emitting devices 103 are composed of any of the white light emitting devices, red/blue/green light emitting devices, and blue, yellow light emitting devices.

Figure 18:
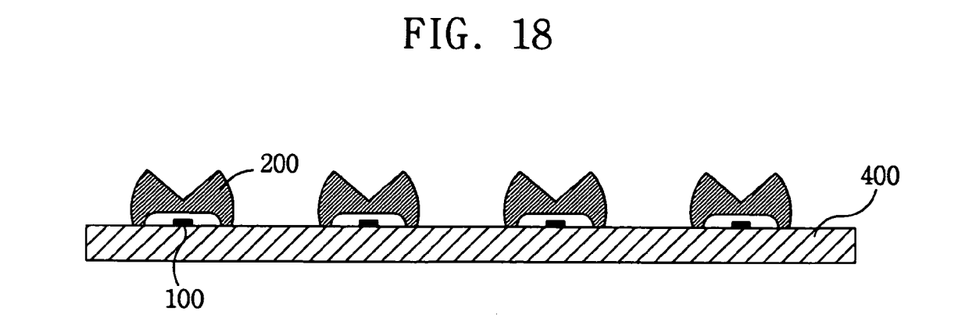
FIG. 18 is a cross-sectional view of a substrate packaged by light emitting devices using an optical lens according to the present invention.

Now, referring to FIG. 18, an upper surface of a substrate 400 is mounted by a plurality of light emitting devices 100, each device 100 spaced a predetermined distance apart, by way of conductive bonding method, where each light emitting device 100 is wrapped by the optical lens 200 of the present invention.

If the light emitting device 100 is directly bonded to the substrate 400, thickness of a display panel can be decreased when the light emitting device is used for a backlight unit.

Figure 19:
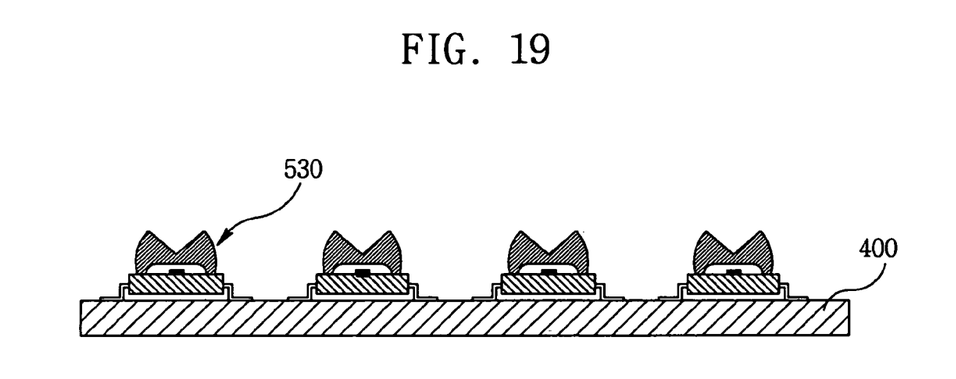
FIG. 19 is a cross-sectional view of a substrate packaged by light emitting devices according to the present invention.

FIG. 19 is a cross-sectional view of a substrate packaged by light emitting devices according to the present invention, where a plurality of light emitting device packages mounted with optical lenses 530 are packaged on an upper surface of the substrate 400, each package being spaced a predetermined distance apart.

The substrate 400 packaged by the plurality of light emitting device packages 530 may be employed for a backlight unit of a display. However, unlike the prior art, there is no need of using a hot spot baffle plate called a diverter, such that an assembly work of the display panel can be simplified and an erroneous array of the hot spot baffle plate can be prevented. There is another advantage in that lateral light emission efficiency is excellent to enable to improve the picture quality of the display. There is still another advantage in that the thickness of the display panel can be reduced as much as that of the hot spot baffle plate to enable to decrease the thickness of the overall thickness of the display panel.

The aforementioned optical lens and a light emitting device package using the optical lens may be applied to all industrial devices including displays, illumination devices, electric bulletin boards and switches for automobiles, and are not limited to the fields thus mentioned.

Figure 20:
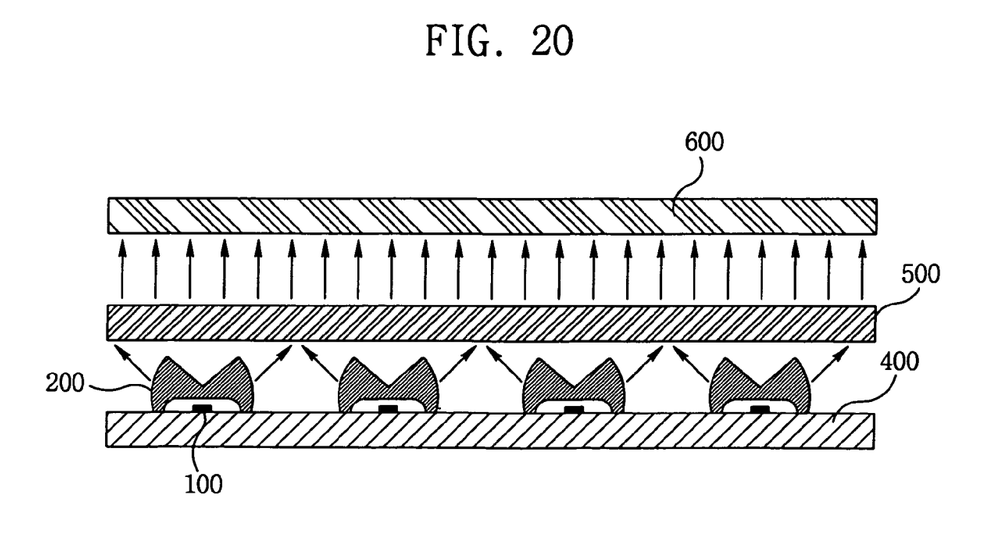
FIG. 20 is a schematic cross-sectional view of a backlight unit according to the present invention.

FIG. 20 is a schematic cross-sectional view of a backlight unit according to the present invention, where the backlight unit using an optical lens according to the present invention comprises: a substrate 400; a plurality of light emitting devices 100 packaged on the substrate 400 for emitting light; a plurality of optical lenses 200 including a reflection surface formed thereon for reflecting light emitted upwards from thereunder, and a bottom refraction surface for refracting the light emitted upwards from thereunder and allowing the light to reach the reflection surface; and a diffusion plate 500 disposed on the plurality of optical lenses 200.

The backlight unit of FIG. 20 uses the substrate of FIG. 18, and if the substrate of FIG. 19 is employed, the backlight unit may be further disposed with a base member on which the light emitting devices are bonded, terminals electrically connected to the light emitting devices, and a molding unit for partially exposing the terminals and wrapping the light emitting devices and the base member. In other words, the light emitting devices are packaged by the molding unit and the optical lens is attached to an upper surface of the molding unit.

Meanwhile, the diffusion plate 500 is mounted thereon with a liquid crystal display panel 600.

As apparent from the foregoing, there are advantages in the present invention thus described according to the present invention in that light irradiated upward of a light emitting device is refracted from a bottom refraction surface to allow reaching a reflection surface, and an optical lens is mounted for reflecting the light sideways of the lens from the reflection surface to minimize an amount of light irradiated upward of the lens while increasing the amount of light irradiated toward the lateral surface of the lens, thereby limiting the generation of a hot spot to the maximum.

There is another advantage in that the present invention dispenses with a hot spot baffle plate and a complicated assembly process to enable to reduce the number of parts and to decrease the thickness of a panel.

Although various embodiments utilizing the principles of the present invention have been shown and described in detail herein, and various preferred modes of operation are provided, those skilled in the art can readily devise many other variances, modifications, and extensions that still incorporate the principles disclosed in the present invention. The scope of the present invention embraces all such variances, and shall not be construed as limited by the number of active elements, wiring options of such, or the polarity of a light emitting device therein.

What is claimed is:

1. A light emitting device package, comprising:
    a light emitting device emitting light;
    an optical lens formed over a top surface of the light emitting device, and having a reflection surface for reflecting the light emitted upward from the light emitting device and an external refraction surface for refracting the light reflected from the reflection surface, wherein the optical lens is formed thereon with a recess, and the reflection surface is an inner lateral surface of the recess, and wherein the external refraction surface is connected to the reflection surface, and is a round convex surface having a continuously curvillnear shape being extended from an area connected to the reflection surface to a bottom of the optical lens.

2. The package of claim 1, wherein the optical lens is shaped of a hemisphere.

3. The package of claim 2, further comprising:
    a base member bonded by the light emitting device;
    a terminal electrically connected to the light emitting device; and
    a molding unit for partially exposing the terminal and encompassing the light emitting device and the base member.

4. The package of claim 3, wherein the base member is a heat slug or a sub-mount substrate.

5. The package of claim 4, wherein the light emitting device is made of one of a group consisting of:
    devices including a blue light emitting device for emitting blue light and a yellow light emitting device for emitting yellow light;
    devices including a red light emitting device for emitting red light, a green light emitting device for emitting green light and a blue light emitting device for emitting blue light; and
    a single light emitting device for emitting white light.

6. The package of claim 5, wherein the external refraction surface is a refracting surface for refracting light to a lateral surface of the optical lens.

* * * * *